United States Patent [19]

Armanini

[11] Patent Number: 5,008,143

[45] Date of Patent: Apr. 16, 1991

[54] DECORATIVE OBJECTS WITH MULTI-COLOR EFFECTS

[75] Inventor: Louis Armanini, Pleasantville, N.Y.

[73] Assignee: The Mearl Corporation, Ossining, N.Y.

[21] Appl. No.: 453,385

[22] Filed: Dec. 7, 1989

Related U.S. Application Data

[63] Continuation of Ser. No. 70,022, Jul. 6, 1987, abandoned.

[51] Int. Cl.[5] .............................................. C09D 5/29

[52] U.S. Cl. .................................. 428/207; 106/413; 106/417; 106/436; 350/164; 350/166; 428/329; 428/403; 523/171

[58] Field of Search ............... 428/204, 207, 329, 354, 428/407, 403; 427/201, 262; 350/163, 164, 165, 166; 523/135, 171; 106/413, 417, 418, 436

[56] References Cited

U.S. PATENT DOCUMENTS

| | | | |
|---|---|---|---|
| 3,819,566 | 6/1974 | Pinsky et al. | 523/171 |
| 3,821,155 | 6/1974 | Kloos | 523/171 |
| 3,843,571 | 10/1974 | Fitzgerald | 523/171 |
| 4,010,293 | 3/1977 | Davis | 428/324 |
| 4,267,229 | 5/1981 | Knight et al. | 523/171 |
| 4,539,258 | 9/1985 | Panush | 428/324 |
| 4,544,415 | 10/1985 | Franz et al. | 428/407 |
| 4,551,491 | 11/1985 | Panush | 428/324 |
| 4,598,015 | 7/1986 | Panush | 428/324 |
| 4,598,020 | 7/1986 | Panush | 428/324 |
| 4,615,940 | 10/1986 | Panush | 428/324 |
| 4,668,570 | 5/1987 | Esselborn et al. | 428/324 |
| 4,670,314 | 6/1987 | Iwasa et al. | 428/328 |
| 4,705,356 | 11/1987 | Berning et al. | 350/166 |
| 4,744,832 | 5/1988 | Franz et al. | 428/324 |
| 4,753,829 | 6/1988 | Panush | 523/171 X |
| 4,755,229 | 7/1988 | Armanini | 106/413 |

*Primary Examiner*—George F. Lesmes
*Assistant Examiner*—Christopher Brown
*Attorney, Agent, or Firm*—Ostrolenk, Faber, Gerb & Soffen

[57] ABSTRACT

An article exhibiting a multicolor effect is obtained by combining a transparent substrate, an interference pigment and an absorption colorant, the pigment and colorant preferably united in the form of a combination pigment, in which the absorption colorant is of a color which is different from the transmission color of the interference pigment or the complement thereof.

10 Claims, No Drawings

DECORATIVE OBJECTS WITH MULTI-COLOR EFFECTS

This is a continuation of application Ser. No. 070,022, filed on July 6, 1987, now abandoned.

Historically, interference pigments are an outgrowth of nacreous pigments, that is, pigments which simulate the effect of natural pearls. The pigments are composed of thin platelets which are transparent in the visible region of the spectrum. The platelets are very smooth and part of the light which strikes the platelets is reflected and part is transmitted through the platelet. That part of the light which is transmitted is subsequently reflected by other layers of platelets. The result is that there are multiple reflections from many layers and it is this which gives rise to a depth of sheen since the eye cannot focus on one particular layer.

The reflection which takes place is specular in that the angle of incidence equals the angle of reflection. The amount of light reflected at non-specular angles is small and the amount of light reflected diminishes very quickly as the specular angle is passed. The result is that nacreous pigments are extremely sensitive to the angle of viewing. In order for the maximum amount of light to be reflected, the platelets must be extremely smooth. Any surface roughness causes light to be scattered in a non-specular manner and diminishes the lustrous effect.

The platelets must be aligned parallel to each other and to the substrate for maximum reflectivity. If not so aligned, light will be reflected randomly and again, luster will diminish. The amount of light which is reflected depends on the index of refraction of the platelets. The greater the index of refraction, the greater the amount of light reflected. Since in most cases, the platelets are imbedded in film forming mediums which have an index of refraction of approximately 1.5, it is necessary that the index of refraction of the platelets be considerably greater than 1.5.

In the case of the natural pearl, the layers of reflecting material are composed of calcium carbonate interspersed between layers of an organic material. Synthetic nacreous pigments have been made by growing crystals of basic lead carbonate and bismuth oxychloride. Both of these substances can be grown into crystals which are extremely smooth and flat. More recently, titanium dioxide, which per se has not been grown into flat crystals has been coated on thin smooth platelets of mica which act as a carrier. The mica platelets are ideally from 5 to 50 microns in length. The coatings of titanium dioxide which ar applied generally range from 60 nanometers to 160 nanometers in thickness.

It is found that with a coating of 60 nanometers of titanium dioxide on mica, a pearl or white lustrous pigment results. As the thickness of the titanium dioxide is increased, interference of light results and the colors of the rainbow are produced. Thus, it is possible to produce color using only a transparent layer of titanium dioxide. The colors seen from an oil slick or from a soap bubble are examples of interference colors. The colors from an oil slick or from a soap bubble disappear when the soap bubble collapses or the oil slick disappears. The colors from the interference pigments, however, are permanent and can be incorporated into film-forming mediums to impart color. Interference pigments not only impart color but because of their constitution, also impart luster.

Other substances besides titanium dioxide can be used as the coating on mica. These include $ZrO_2$, $SnO_2$, ZnO, $Fe_2O_3$, $Cr_2O_3$, $V_2O_5$ and the hydros forms thereof. The oxides can be present in various crystalline forms. For example, $TiO_2$ can be anatase or rutile or mixtures of the two. Combinations of oxides of two or more metals can be used as can their different crystalline forms.

Interference pigments, if composed of the correct thickness, can reflect any color of the visible spectrum. These colors can range from a yellow to a red to a blue and a green. Shadings between these are also possible. Because the reflected colors are produced by an interference effect, the complementary colors are produced by transmission. Thus if a red color is produced by reflection from an interference pigment, a green color will be seen if the pigment is viewed in transmission.

If interference pigments are incorporated into film formers and coated on white backgrounds, then two colors can be seen depending on the angle of viewing. At near specular angles, the reflected color can be observed. At other angles, the transmission color can be observed.

In order to enhance the reflection color, absorption pigments have been added to interference pigments. In most cases, the absorption pigments have been precipitated onto the interference pigments so that they form an integral part of the platelets. Thus, for example, if $Fe_2O_3$ which has a yellow to red color depending on its particle size is precipitated upon a yellow interference color, an enhancement of the yellow color will be produced. The yellow of the $Fe_2O_3$ adds to the yellow of the interference color producing a rich lustrous yellow color. Those pigments which have an absorption pigment added to an interference pigment resulting in enhanced color intensity are called combination pigments.

Other colorants besides $Fe_2O_3$ have been used. In order to enhance the red interference color, carmine, an organic red colorant, is added to a red interference pigment. In order to enhance the blue, iron blue is added, and in order to enhance the green, $Cr_2O_3$ is added.

If a colored oxide is used for the coating on mica, that color will combine with the added colorant and will modify the final absorption color. If a colorless oxide is used for the coating on mica, the absorption color will not be modified.

The concentration of the absorption pigments is adjusted so that the color intensity produced is of the same order of magnitude as the interference colors. If the concentration of the colorants is too great, the absorption colorant will obscure the interference color and no enhancement will take place. In order for this enhancement to take place, the colorants are added at a concentration between about 2% and 5% in the case of $TiO_2$ coated mica pigments, based upon the weight of titanium dioxide coated mica.

Not only can the absorption pigment of the same color as the interference color be added but different absorption colorants can be added to different interferences colors. Thus, for example, it is possible to add a red absorption pigment (carmine) to a blue interference pigment.

When absorption colorants differ in color from the interference color, interesting color effects are produced depending on the background and the angle of viewing. Since the concentration of the colorants is quite low, when the combination pigments are displayed over a black background, the black absorbs the color of the colorant and only the reflection color of the interference is observed. This is true whether the pigments are observed at the normal angle or the grazing angle.

When the combination pigments are dispersed in a film-forming medium and coated over a white background, two distinct colors can be observed depending on the angle of viewing. At the normal angle of viewing, the reflection color of the interference pigment is seen. At the diffuse angle or the grazing angle, the reflection color of the interference pigment is no longer observed and the color of the absorption pigment is now seen. Thus by changing the angle of viewing from the normal to a grazing angle, the color changes from the reflection color of the interference to the color of the absorption pigment. Very beautiful and esthetically pleasing color effects can be seen.

Combination pigments have been used in applications such as coating on white, grey or black substrates or incorporating them into formulations used for cosmetic applications such as eye shadow, etc. where such color changes would be desirable.

It has now been discovered that there is a third color which is formed and that is the subject of this invention. If the known combination pigments are incorporated into a transparent film-forming medium and coated on a transparent substrate such as glass, acrylic sheet etc. a third color can be seen. This third color is different in color from both the reflection color and the color of the absorption pigment. The third color is formed from the mixing of the transmission color of the interference pigment with the color of the absorption pigment. These third colors have, heretofore, not been seen because combination pigments are not used on transparent substrates.

In order to demonstrate the colors which are formed, interference pigments made from titanium dioxide coated mica were used as base substrates. Four interference colors were used. They were yellow, red, blue and green. The absorption pigments which were used were a yellow ($Fe_2O_3$), a red (carmine), a blue (iron blue) and a green ($Cr_2O_3$). Each of the absorption colorants was precipitated upon the interference pigments forming a total of 16 samples. The concentration of the colorants ranged between 2% and 5%. Other colorants may be used in place of the colorants specified in these examples.

After appropriate processing, the combination pigments were incorporated at 3% concentration into a nitrocellulose lacquer having a solids content of 9.5%. Films of the combination pigments dispersed in the nitrocellulose lacquer were formed on glass slides using a Bird Film Applicator. This formed a wet film of approximately 0.003 inch. The films were allowed to dry so that the platelets were aligned parallel to the film.

The dried films were viewed visually in daylight by observing the specular reflection color at normal incidence, by observing the color at a diffuse or grazing angle and finally by observing the color by transmission. The observer stood with daylight at his back and the slide held so that the light struck the surface and was specularly reflected back to the observer. For diffuse reflection, the slide was held toward the light so that the light fell upon the surface at a grazing angle and then was reflected to the observer. For transmission, the slides were held to the light. The colors which were observed were recorded and the results of these observations are shown in Table I. For comparison, the observations made on the interference pigments which contained no absorption pigments are also set forth. The combinations which exhibited the most distinct three-color effects are indicated by an asterisk.

These examples demonstrate that when the color of the absorption pigment is different from the reflecting color of the interference pigment or its complement (the transmission color), a new color is formed. Thus, a red colorant precipitated on a yellow interference pigment (transmission color blue) formed a third color, purple, by transmission. A green colorant on the same yellow interference pigment formed a bluegreen color by transmission.

From the foregoing, it can be seen that various shades are possible depending on the identity and concentration of absorption colorant used. A greater concentration of colorant will tend to shade the color in the direction of the colorant. If too great a concentration of colorant is used, the transmission color will be masked and obscured and only the absorption colorant will be seen. The concentration of the absorption colorant is therefore determined by the intensity of the transmission color. For the commercially available interference pigments, a concentration of absorption pigment varying between 2% and 5% has been found to produce interesting third colors.

The combination pigments which have been used in the Table to demonstrate third color effects had the absorption pigments precipitated directly on the surfaces. Similar results can be achieved by dispersing the absorption colorants and the interference pigments separately in the film former. In this case, the absorption colorant is dispersed throughout the film rather than being concentrated upon each platelet. Similar, though not exactly equivalent, results are produced. As can be expected, different concentrations of colorant will be needed and these can be easily determined by a few routine experiments.

Any object which is transparent or semitransparent and which will allow some of the light to pass through and which can be coated with the combination pigments or have them incorporated therein can be used. This includes glass bottles, glass sheets, sheets of transparent acrylic, polyester, etc.

EXAMPLE 1

A combination pigment of a yellow absorption colorant and a red interference pigment was dispersed in a water base acrylic polymer emulsion. The dispersion was made by taking 3.0 g of the combination pigment, adding approximately 3 g of the emulsion and stirring in thoroughly. Then 94 g of the emulsion was slowly added with stirring to form a 3% concentration of the combination pigment in the emulsion. This pigmented emulsion was then applied by brush to a clear transparent acrylic sheet, one quarter inch in thickness, and the emulsion allowed to dry. Small sections were then cut from this sheet. Each of the sections when viewed at the specular angle showed a red interference color, a yellow color at the glancing angle and by transmission, a yellow-green color.

Similar sections were made using different combination pigments. The sections were mounted on a large acrylic panel to simulate a stained glass effect depicting various scenes.

EXAMPLE 2

A combination pigment of a red absorption colorant on a blue interference pigment was dispersed in a clear thermosetting acrylic enamel (AT56 Rohm & Haas Co.) and diluted in a ratio of 2:1 with xylene. The dispersion was made by taking 3.0 g of the combination pigment and adding approximately 3 g of the thermosetting acrylic which was stirred in thoroughly. Then 94 g of the acrylic enamel was added with stirring. The pigmented acrylic enamel was applied to a large transparent glass bowl approximately 24 inches in diameter. The coating was applied using a conventional air spray gun. Two layers were applied. The coating was then cured in an oven at 120° C. for 30 minutes. Viewing the bowl directly a blue reflection color was seen. The sides of the bowl displayed a red absorption color and the rear of the bowl where the transmission color could be seen displayed an orange color. The colors blended one into the other and a pleasing artistic effect was produced which was a delight to the eye.

EXAMPLE 2A

The components of the combination pigment of Example 2 were introduced separately into the acrylic lacquer of that example. The red colorant was first dispersed followed by the blue interference pigment. The color play in the coated bowl was similar to that seen in Example 2.

EXAMPLE 3

A combination pigment of a red absorption pigment on a yellow interference pigment was dispersed in a nitrocellulose lacquer. The dispersion was made by mixing 3.0 g of the pigment with 3 g of a nitrocellulose lacquer having a solids content of 9.5%. After thorough mixing, an additional 94 g of the nitrocellulose lacquer was added with stirring. Films of the dispersed particles in the nitrocellulose lacquer were formed on glass slides by using a Bird Film Applicator. This formed a wet film of approximately 0.003 inch. The films were allowed to air dry. The glass slides were then cut into rectangular sections, 2 inches by 3 inches, and provision made so the slides could be hung by a wire or string.

Similar slides were made using the combination pigment of a red colorant on a yellow interference pigment and the combination pigment of a yellow colorant on a red interference pigment. The slides were then hung from strings as in a mobile and beautiful color effects could be seen as each slide, revolving slowly by air currents, alternately showed various colors by reflection and transmission.

EXAMPLE 4

A combination pigment of a blue colorant and green interference pigment was dispersed in a low density polyethylene. 950 g of Tenite 1925F made by Eastman Chemicals was put into a Banbury Mixer. The plastic was mixed until melted. 50 g of the combination pigment were then added slowly to the melted plastic and mixing was continued for 10 minutes. After the mixing cycle was complete, the pigmented plastic was dumped into a pan and taken immediately to a Boling Steward hot roll machine where the pigmented plastic was pressed between the 2 hot rolls to form a slab $\frac{1}{4}$ to $\frac{1}{2}$ inch in thickness and 10 inches wide. It was scored with a razor knife, allowed to cool, and broken into small pieces. It was then granulated in a Cumberland Granulator. After granulation, the material was taken to a Killian Extruder where it was extruded from a sheeting die forming a sheet approximately 4 mils in thickness. A green color was observed at the specular angle, a blue color at a glancing angle and by transmission, a purple color was seen. Similar sheets could be made using different combination pigments and all could be cut into different patterns and suitably mounted on a clear substrate (for example between 2 pieces of glass) to form an art work which had a myriad of colors.

From the examples set forth hereinbefore, it can be seen that the combination pigments can be applied to a substrate by methods which are known in the art. The coating methods include brush, roll, knife, pressure-roll, engraving roll, dipping, air blade, air spray, electrostatic spray, airless spray, fluidized bed and other similar methods. The pigmented plastics can also be molded by any of the known processes which include compression molding, injection molding, extrusion, or blow molding. They may also be cast by various processes.

The thermoplastics which can be used include cellulose acetate, cellulose acetate butyrate, polycarbonate, polyethylene, polypropylene, polystyrene, and similar materials. The thermosetting plastics include epoxy resins, phenol-formaldehyde acrylic, polyesters, polystyrene, polyurethanes and similar products.

TABLE I

VISUAL OBSERVATIONS OF COATED GLASS SLIDES

| Color | Reflection Color at Normal Incidence | Color at Diffuse Angle, Appx.-15/60 | Transmission Color |
| --- | --- | --- | --- |
| Interference Gold (IY) | Yellow | White | Blue |
| IY & Yellow Colorant | Yellow | Yellow | Neutral |
| IY & Red Colorant | Yellow | Red | Purple* |
| IY & Blue Colorant | Yellow | Blue | Blue |
| IY & Green Colorant | Yellow | Green | Blue-Green |
| Interference Red (IR) | Red | White | Green |
| IR & Yellow Colorant | Red | Yellow | Yellow-Green* |
| IR & Red Colorant | Red | Red | Neutral |
| IR & Blue Colorant | Red | Blue | Blue-Green* |
| IR & Green Colorant | Red | Green | Green |
| Interference Blue (IB) | Blue | Sl. Yellow | Yellow |
| IB & Yellow Colorant | Blue | Yellow | Yellow |
| IB & Red Colorant | Blue | Red | Orange* |
| IB & Blue Colorant | Blue | Blue | Blue-Green |
| IB & Green Colorant | Blue | Green | Yellow-Green* |
| Interference | | | |

TABLE I-continued

VISUAL OBSERVATIONS OF COATED GLASS SLIDES

| Color | Reflection Color at Normal Incidence | Color at Diffuse Angle, Appx.-15/60 | Transmission Color |
|---|---|---|---|
| Green (IG) | Green | White | Purple |
| IG & Yellow Colorant | Yel-Green | Yellow | Orange* |
| IG & Red Colorant | Green | Red | Red |
| IG & Blue Colorant | Green | Blue | Blue-Purple* |
| IG & Green Colorant | Green | Green | Orange |

What is claimed is:

1. An article exhibiting a multicolor effect consisting essentially of a transparent body, an interference pigment and an absorption colorant in which said absorption colorant is of a color which is different from the reflection color of the interference pigment or the complement thereof and in which the interference pigment and absorption colorant have the same order of magnitude of color intensity.

2. An article according to claim 1 wherein the interference pigment and absorption colorant are united to form a combination pigment.

3. An article according to claim 1 wherein the interference pigment and absorption colorant are independently dispersed in said body.

4. An article according to claim 1 wherein the absorption colorant is selected from the group consisting of iron oxide, carmine, iron blue and chrome oxide.

5. The article of claim 4 wherein the interference pigment is titanium dioxide coated mica.

6. The article of claim 4 wherein the interference pigment is titanium dioxide coated mica and the amount of absorption colorant is between about 2 and 5% by weight based on the weight of the interference pigment.

7. The article of claim 1 wherein the interference pigment exhibits a gold color and the absorption colorant exhibits a purple color.

8. The article of claim 1 wherein the interference pigment exhibits a red color and the absorption colorant exhibits a yellow or green color.

9. The article of claim 1 wherein the interference pigment exhibits a blue color and the absorption colorant exhibits a red or green color.

10. The article of claim 1 wherein the interference pigment exhibits a green color and the absorption colorant exhibits a yellow or blue color.

* * * * *